Figure 1:
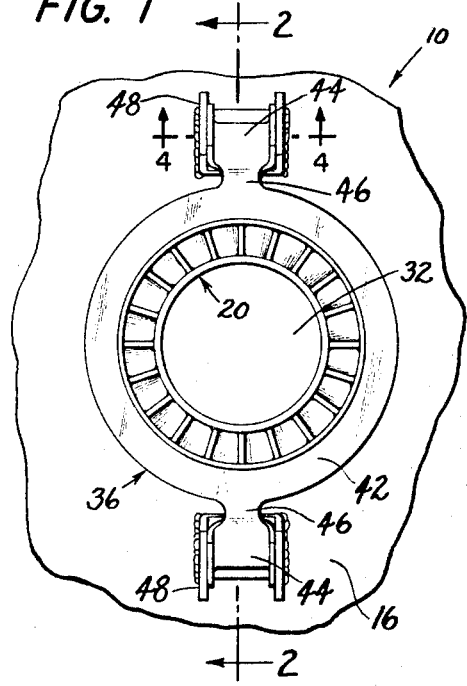

Sept. 20, 1966  S. J. CRETELLA  3,273,343

COMBUSTION CHAMBER CONSTRUCTION IN GAS TURBINE POWER PLANT

Filed March 8, 1965

INVENTOR.
Salvatore J. Cretella
BY
McCormick, Paulding & Huber
ATTORNEYS

United States Patent Office 3,273,343
Patented Sept. 20, 1966

3,273,343
COMBUSTION CHAMBER CONSTRUCTION IN GAS TURBINE POWER PLANT
Salvatore J. Cretella, North Haven, Conn., assignor to Dickens Inc., New Haven, Conn., a corporation of Connecticut
Filed Mar. 8, 1965, Ser. No. 437,698
5 Claims. (Cl. 60—39.72)

This invention relates to an improved combustion chamber construction and, more particularly, to an improved construction of a portion of a gas turbine combustion chamber adjacent and associated with the fuel and compressed air inlet opening.

In conventional gas turbine combustion chamber construction, a swirl ring is provided within the fuel and compressed air inlet opening. The swirl ring provides an entrance passageway for and imparts a swirl to compressed air introduced to the chamber and the ring also has a central opening for receiving a fuel nozzle. In the usual form, the swirl ring is supported by a retaining ring and by engagement of a radial flange thereon with an inner portion of the combustion chamber housing. That is, the retaining ring and the radial flange secure the swirl ring against axial and rotational movement but clearance is provided for slight radial movement of the ring.

In use, the aforementioned swirl ring and retaining ring assembly is generally satisfactory, but wear does occur over periods of use and the edge portion of the combustion chamber housing adjacent the inlet opening is particularly susceptible to such wear. In the overhaul and rebuilding of gas turbine power plants, it is a conventional practice to remove a worn section of a front end portion of the combustion chamber housing adjacent the inlet opening and to weld a "flush patch" in place and then to assemble a new swirl ring and retaining ring in the patch inlet opening as required. This rebuilding procedure is generally satisfactory, but the patching procedure is not economically advantageous and the patch is, of course, subject to wear in the same manner as the original front portion of the combustion chamber housing.

It is the general object of the present invention to provide an improved combustion chamber construction which is particularly well suited to overhaul and rebuilding operations but which is also readily adaptable for use in original factory constructions and which in either event provides substantial improvement in wear resistance.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

Figure 3:
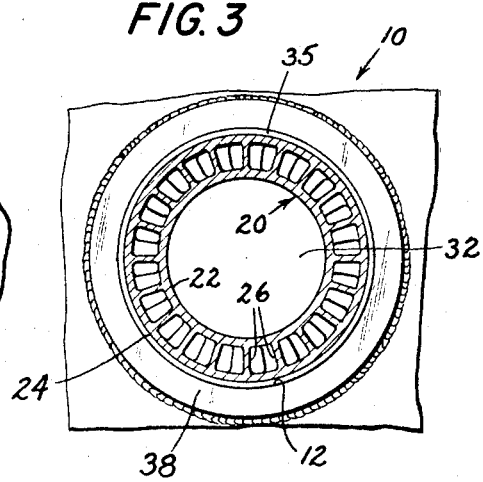
Figure 2:
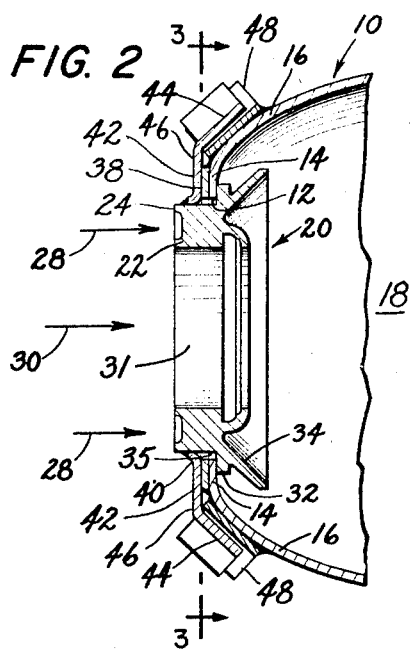
Figure 4:
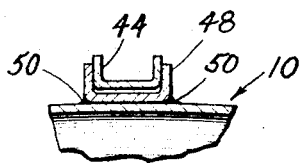

Of the drawing:
FIG. 1 is a front end view of a portion of a combustion chamber housing and shows the improved construction of the present invention.
FIG. 2 is a vertical section taken generally as indicated at 2—2 in FIG. 1.
FIG. 3 is a vertical section taken generally as indicated at 3—3 in FIG. 2.
FIG. 4 is a fragmentary section taken generally as indicated at 4—4 in FIG. 1.

As is well known, gas turbine power plants include a plurality of combustion chambers or "burner cans" between their compressor and turbine sections. Compressed air is supplied to the chambers or "cans" from the compressor section of the power plant, and it is a conventional practice to introduce fuel together with the compressed air, a fuel nozzle being disposed within an opening in an air handling swirl ring. Combustion occurs continuously in the combustion chambers or "burner cans" and the hot gases of combustion are discharged to the turbine section and thence to the exhaust section of the power plant. For a description of a typical gas-turbine power plant reference may be had to the B. S. Savin, Jr. Patent 2,747,367 entitled Gas Turbine Power Plant Supporting Structure.

Referring particularly to FIGS. 1 and 2, a front end portion of a combustion chamber housing is partially shown at 10. The portion of the chamber housing shown is intended to conform generally to the configuration of the combustion chambers or "burner cans" in the well known JT-4 Gas Turbine Power Plant, but the invention is not so limited.

As best illustrated in FIG. 2, a circular inlet opening 12 is provided in the front end portion of the combustion chamber housing 10, and an annular portion immediately adjacent thereto at 14 is substantially flat and extends in a radial plane. A next adjacent annular portion 16 of the combustion chamber housing 10 is inclined rearwardly and outwardly toward the main portion of the combustion chamber 18. Compressed air and fuel are introduced from left to right to the combustion chamber 18 and through a swirl ring 20.

The swirl ring 20 is disposed in the circular inlet opening 12 and includes inner and outer annular members 22, 24 connected by an annular series of short generally radially extending swirl vanes 26, 26. As indicated by the arrows 28, 28 compressed air flows from left to right through the swirl vanes 26, 26 for introduction to the combustion chamber 18 and fuel may also flow from left to right as indicated by the arrow 30 through an appropriate nozzle received in a central opening 31 in the swirl ring.

The swirl ring 20 extends axially forwardly and rearwardly from the annular portion 14 of the combustion chamber housing 10, and the aforesaid outer annular member 24 has a radially outwardly projecting annular flange at 32 and a generally bell mouth annular exit portion 34 disposed rearwardly of the housing portion 14. The flange 32 is disposed at least approximately in axial engagement with the rear or inner surface of the annular housing portion 14 adjacent the inlet opening 12 and an adjacent portion of the outer annular member 24 is disposed radially within the said opening. As will be observed, a slight clearance is provided at 35 as a result of the annular portion 24 being somewhat smaller in diameter than the opening 12. Thus, slight radial movement of the swirl ring 20 within the opening 12 can be accommodated.

The aforedescribed swirl ring 20 is or may be a part of the original assembly of the combustion chamber housing and it will be apparent that a retaining means is required to secure the swirl ring against axial and rotational movement. A retaining ring is illustrated at 36 and is somewhat similar to a retaining ring supplied as original equipment in the combustion chamber construction. It will be observed, however, that a reinforcing or patch ring 38 is disposed between the retaining ring 36 and the front surface of the chamber housing 10 adjacent the inlet opening 12. The reinforcing or patch ring 38 is positioned as shown and is welded to the annular portion 14 of the housing 10 in accordance with the present invention. In an overhaul or rebuilding operation, the reinforcing or patch ring 38 takes the place of the aforementioned "flush patch," and in an original construction of the housing the ring 38 may serve merely as a reinforcing member. As shown, the ring 38 is at least approximately in axial engagement with the front surface of the housing portion 14 and has approximately the same inner diameter as that of the inlet opening 12. The ring 38 should be at least twice as wide as it is thick and may exceed this dimensional relationship.

The retaining ring 36 is shown welded to a front end peripheral portion of the outer annular member 24 of the swirl ring 20. A short axially extending annular flange 40 is provided on the ring 36 and a generally flat and radial body portion of the ring is illustrated at 42. In accordance with one feature of the invention, the radial dimension of the retaining ring 36 is at least twice the thickness of the material from which the ring is formed.

Still further in accordance with the present invention at least one radially extending ear is provided on the retaining ring 36 and, as shown, similar diametrically opposite first and second ears 44, 44 are provided. The ears may vary widely in form but they are preferably generally U-shaped in cross section when viewed along radii and legs 46, 46 of the U-shaped portions thereof extend generally forwardly or approximately in the axial direction of the aforementioned short axial flange 40. As will be observed, outer end portions of the ears 44 extend angularly rearwardly between radial and axial planes or in an axial direction generally opposite to that of the flange 40.

Bracket means are provided for connection with the ears 44, 44 and similar bracket means are shown at 48, 48. Said means may vary in form, but preferably U-shaped and adapted to receive the corresponding U-shaped portions of the ears 44, 44. The brackets 48, 48 are attached to the aforementioned outwardly and rearwardly extending annular portion 16 of the housing 10 as by means of suitable welds indicated at 50, 50.

From the foregoing it will be apparent that the ears 44, 44 are movable over a slight vertical range to accommodate slight radial movement of the retaining ring 36 and the swirl ring 20. The retaining ring 36, however, secures the swirl ring 20 against axial movement and against rotation, the U-shaped ear portions 46, 46, being held in this direction by the similar shaped brackets 48, 48.

As mentioned above, wear occurs primarily at the edge of the inlet opening 12 and the prior overhaul and rebuilding technique has employed a "flush patch" in the front end portion of the housing 10. A method of rebuilding with the present improved construction requires merely that the reinforcing or patch ring 38 be welded to the annular housing portion 14 and that the swirl ring 20 and retaining ring 36 be assembled as shown. On assembly, it is found that the wear resistance of the construction is enhanced to a significant degree. The approved life of the combustion chamber is many hours in excess of that established for the aforesaid prior construction. Such improvement is attributed to the particular improved construction including the reinforcing or patch ring 38 and the retaining ring 36, the said rings having the particular dimensional relationships mentioned.

The invention claimed is:

1. In a gas turbine power plant, the combination of a front end portion of a combustion chamber housing having a circular inlet opening for the introduction of compressed air and fuel to the chamber, a swirl ring in said opening and comprising radially spaced inner and outer annular members connected by an annular series of short generally radially extending swirl vanes, said swirl ring extending axially forwardly and rearwardly from said front end portion of said chamber housing and the said outer annular member thereof having a radially outwardly projecting annular flange and a generally bell mouth annular exit portion disposed rearwardly of said chamber end portion, said flange being at least approximately in axial engagement with a rear surface of said chamber front end portion adjacent said inlet opening and an adjacent part of said outer annular member disposed radially within the said opening being substantially smaller than the opening to accommodate slight radial movement of the ring, a flat reinforcing ring disposed about said outer annular member of said swirl ring forwardly of and at least approximately in axial engagement with said front end portion of said combustion chamber housing, a retaining ring welded to and about a front end portion of said outer annular member of said swirl ring forwardly of and at least approximately in axial engagement with said reinforcing ring, said retaining ring having at least one generally radially extending ear, and a bracket means on said front end portion of said combustion chamber housing engaging said ear and securing said retaining ring and swirl ring against rotation in said opening.

2. The combination in a gas turbine power plant as set forth in claim 1 wherein said front end portion of said combustion chamber housing immediately adjacent said opening is substantially flat and radial with a next adjacent portion thereof inclined rearwardly and outwardly, and wherein said ear on said retaining ring is inclined rearwardly and outwardly along said next adjacent portion, said bracket means being welded on said next adjacent portion of the housing front end portion.

3. The combination in a gas turbine power plant as set forth in claim 1 wherein two diametrically opposite generally radial ears and bracket means are provided, and wherein each ear is generally U-shaped in cross section at an end portion and each bracket means generally U-shaped to receive the ear.

4. The combination in a gas turbine power plant as set forth in claim 1 wherein the radial dimension of said reinforcing ring is at least twice the axial dimension thereof, and wherein the radial dimension of the retaining ring is at least twice the thickness of the material from which the ring is formed.

5. A retaining ring for use with a swirl ring and a reinforcing ring assembly in a combustion chamber housing for a gas turbine power plant, said ring having a short annular flange which projects axially in one direction and a flat radially extending body portion, said body portion being at least twice as wide as it is thick and being provided at diametrically opposed locations with first and second similar ears, each of said ears extending angularly outwardly between radial and axial planes in a direction generally opposite said axial flange, and each of said ears being generally U-shaped in cross section when viewed along radii, the legs of the U-shaped ears extending from the ears in the general direction of said axial flange.

References Cited by the Examiner
UNITED STATES PATENTS

| | | | |
|---|---|---|---|
| 2,618,928 | 11/1952 | Nathan | 60—39.72 |
| 2,771,744 | 11/1956 | Johnson | 60—39.74 |
| 2,800,768 | 7/1957 | Wheeler | 60—39.74 |
| 2,901,032 | 8/1959 | Brola. | |
| 2,907,171 | 10/1959 | Lysholm | 60—39.65 |

MARK NEWMAN, *Primary Examiner.*

R. D. BLAKESLEE, *Assistant Examiner.*